United States Patent
Nagaraja et al.

(10) Patent No.: US 11,432,329 B2
(45) Date of Patent: Aug. 30, 2022

(54) TRANSMISSION CONFIGURATION AND FORMAT FOR RANDOM ACCESS MESSAGES

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Makesh Pravin John Wilson, San Diego, CA (US); Aitzaz Ahmad, Mason, OH (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/052,331

(22) Filed: Aug. 1, 2018

(65) Prior Publication Data

US 2018/0343681 A1   Nov. 29, 2018

Related U.S. Application Data

(63) Continuation of application No. 15/385,058, filed on Dec. 20, 2016, now Pat. No. 10,225,867.
(Continued)

(51) Int. Cl.
*H04W 74/08* (2009.01)
*H04B 7/06* (2006.01)
(Continued)

(52) U.S. Cl.
CPC .......... *H04W 74/0833* (2013.01); *H04B 7/00* (2013.01); *H04B 7/0695* (2013.01);
(Continued)

(58) Field of Classification Search
CPC .......... H04W 72/0446; H04W 72/042; H04W 74/0833; H04W 72/0406; H04W 16/28; H04B 7/0695
See application file for complete search history.

(56) References Cited

U.S. PATENT DOCUMENTS 8,401,031 B2   3/2013  Park et al.
8,842,657 B2   9/2014  Walton et al.
(Continued)

FOREIGN PATENT DOCUMENTS

CN    104521312 A    4/2015
CN    105122662 A    12/2015
WO    2005039133 A1  4/2005

OTHER PUBLICATIONS

Huawei et al., "General Aspects for NR HF Cell", 3GPP Draft; R2-165585, 3rd Generation Partnership Project (3GPP), Mobile Competence Centre; 650, Route Des Lucioles; F-06921 Sophia-Antipolis Cedex; France, vol. RAN WG2, No. Gothenburg, Sweden, Aug. 21, 2016, XP051140999, Retrieved from the Internet: URL:http://www.3gpp.org/ftp/Meetings_3GPP_SYNC/RAN2/Docs/ [retrieved on Aug. 21, 2016], 4 pages.
(Continued)

*Primary Examiner* — Ricardo H Castaneyra
(74) *Attorney, Agent, or Firm* — Haynes and Boone LLP

(57) ABSTRACT

Wireless communications systems and methods related to performing random access procedures. A base station (BS) receives, from a user equipment (UE), a plurality of random access preambles from a plurality of beam directions, wherein each of the plurality of random access preambles is received from a different beam direction, and wherein the plurality of random access preambles are associated with multiple random access opportunities of a random access attempt. The BS sends, in response to the plurality of
(Continued)

random access preambles, a plurality of random access response (RAR) messages in the plurality of beam directions.

30 Claims, 12 Drawing Sheets

Related U.S. Application Data

(60) Provisional application No. 62/383,188, filed on Sep. 2, 2016.

(51) Int. Cl.
  *H04W 16/28* (2009.01)
  *H04W 72/04* (2009.01)
  *H04B 7/00* (2006.01)

(52) U.S. Cl.
  CPC ....... *H04W 16/28* (2013.01); *H04W 72/0406* (2013.01); *H04W 72/0446* (2013.01)

(56) References Cited

U.S. PATENT DOCUMENTS

| | | | |
|---|---|---|---|
| 9,468,022 B2* | 10/2016 | Li | ................. H04B 7/0404 |
| 2013/0148558 A1 | 6/2013 | Malladi et al. | |
| 2014/0016573 A1 | 1/2014 | Nuggehalli et al. | |
| 2014/0177607 A1 | 6/2014 | Li et al. | |
| 2014/0376466 A1 | 12/2014 | Jeong et al. | |
| 2015/0180622 A1* | 6/2015 | Yoo | ................. H04L 27/2602 370/330 |
| 2015/0305066 A1 | 10/2015 | Jeong et al. | |
| 2016/0119038 A1 | 4/2016 | Thomas et al. | |
| 2016/0165640 A1 | 6/2016 | Yang et al. | |
| 2016/0227575 A1 | 8/2016 | Furuskog et al. | |
| 2018/0070380 A1 | 3/2018 | Nagaraja et al. | |
| 2018/0359068 A1* | 12/2018 | Kim | ................. H04W 72/0406 |
| 2019/0174462 A1* | 6/2019 | Harada | ................. H04L 27/00 |
| 2019/0230696 A1* | 7/2019 | Kim | ................. H04L 5/0053 |

OTHER PUBLICATIONS

International Search Report and Written Opinion—PCT/US2017/047590—ISA/EPO—dated Nov. 6, 2017.

ZTE: "Overview of NR Initial Access", 3GPP Draft; R1-166417, 3rd Generation Partnership Project (3GPP), Mobile Competence Centre; 650, Route Des Lucioles; F-06921 Sophia-Antipolis Cedex; France, vol. RAN WG1, No. Gothenburg, Sweden, Aug. 13, 2016, XP051142385, Retrieved from the Internet: URL:http://www.3gpp.org/ftp/tsg_ran/WG1_RL1/TSGR1_86/Docs/ [retrieved on Aug. 13, 2016], 6 pages.

* cited by examiner

1000

Random Access Message Transmission Configuration

| PDSCH_Start_Time 1012 | PDSCH_End_Time 1014 | — 1010 |
| PUSCH_Start_Time 1022 | PUSCH_End_Time 1024 | — 1020 |
| PDCCH_Position 1030 | | |
| PDSCH_Numerology 1040 | | |
| PUSCH_Numerology 1050 | | |
| UCI_Start_Time 1062 | UCI_End_Time 1064 | — 1060 |
| Reference_Numerology 1070 | | |
| Maximum_Opportunities 1080 | | |
| PL_Threshold 1090 | | |

FIG. 10

TRANSMISSION CONFIGURATION AND FORMAT FOR RANDOM ACCESS MESSAGES

CROSS REFERENCE TO RELATED APPLICATIONS

The present application is a continuation application of U.S. Non-Provisional patent application Ser. No. 15/385,058, filed Dec. 20, 2016, which claims priority to and the benefit of the U.S. Provisional Patent Application No. 62/383,188, filed Sep. 2, 2016, the disclosure of each of which is hereby incorporated by reference in its entirety.

TECHNICAL FIELD

This application relates to wireless communication systems, and more particularly to improving random access performance in wireless networks by defining a transmission configuration for transmissions of random access messages in a finer granularity than a system nominal subframe and allowing multiple random access opportunities over multiple beam directions per random access attempt.

INTRODUCTION

A wireless communication network may include a number of base stations (BSs) that can support communication for a number of user equipments (UEs). In recent years, the carrier frequencies at which BSs and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accurate) is becoming necessary.

Certain wireless systems have higher path loss (PL) than the conventional wireless systems. To overcome the higher PL, BSs may perform hybrid beamforming, including analog beamforming and digital beamforming, to create narrow beam patterns for transmissions to UEs. Hybrid beamforming with narrow beam patterns can improve link budget and/or signal-to-noise ratios (SNRs).

In a wireless system, BSs may broadcast synchronization signals such as primary synchronization signal (PSS), secondary synchronization signal (SSS), and extended synchronization signal (ESS), beam reference signal (BRS) and system information in a plurality of directional beams. In addition, the BSs may transmit other reference signals, such as channel state information reference signal (CSI-RS), over the beams to enable UEs to measure channels between the BS and corresponding UEs. A UE may perform initial cell acquisition by listening to the broadcast signals and perform signal measurements based on the synchronization signals, the BRS and/or other signals. The UE may determine receive signal strengths based on the received signals and select a cell and a beam within the selected cell for performing an access procedure.

To perform an access procedure, a UE may send a random access preamble using the same subarray and beam direction as the selected beam and monitor for a random access response (RAR) in a RAR window. When the BS detects the random access preamble, the BS sends a RAR to the UE in the same beam direction as the random access preamble is received. The RAR may include a transmission opportunity for the UE to send a next random access message. Due to beam correspondence, user mobility, rotation, and/or signal blockage, beam characteristics may be varied over time or are different between uplink and downlink at the UE or BS. Thus, the UE may fail to receive the RAR. Upon failing to receive the RAR within the RAR window, the UE may retry after waiting for a backoff period. The retry may cause additional system latency. As such, a random access procedure that sends a single random access preamble in a single beam direction per random access attempt may not be robust. In addition, the sizes of random access messages are typically small, for example, a few hundreds bytes. However, in certain wireless systems with large bandwidths, each random access message when carried in a subframe over a beam direction will result in inefficient resource utilization. Therefore, there is a need to improve random access performance in wireless systems.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of performing a random access procedure in a wireless communication network includes receiving, by a base station (BS) from a user equipment (UE), a plurality of random access preambles from a plurality of beam directions, wherein each of the plurality of random access preambles is received from a different beam direction, and wherein the plurality of random access preambles are associated with multiple random access opportunities of a random access attempt; and sending, by the BS in response to the plurality of random access preambles, a plurality of random access response (RAR) messages in the plurality of beam directions.

In an additional aspect of the disclosure, a method of performing a random access procedure in a wireless communication network includes sending, by a user equipment (UE) to a base station (BS), a plurality of random access preambles in a plurality of beam directions, wherein each of the plurality of random access preambles is transmitted in a different beam direction, and wherein the plurality of random access preambles are associated with multiple random access opportunities of a random access attempt; and receiving, by the UE from the BS in response to one or more of the plurality of random access preambles, one or more random access response (RAR) messages in one or more beam directions of the plurality of beam directions.

In an additional aspect of the disclosure, an apparatus includes a receiver configured to receive, from a wireless communication device, a plurality of random access preambles from a plurality of beam directions, wherein each of the plurality of random access preambles is received from a different beam direction, and wherein the plurality of random access preambles are associated with multiple random access opportunities of a random access attempt; and a transmitter configured to send, in response to the plurality of random access preambles, a plurality of random access response (RAR) messages in the plurality of beam directions.

In an additional aspect of the disclosure, an apparatus includes a transmitter configured to send, to a wireless communication device, a plurality of random access preambles in a plurality of beam directions, wherein each of the plurality of random access preambles is transmitted in a different beam direction, and wherein the plurality of random access preambles are associated with multiple random access opportunities of a random access attempt; and a receiver configured to receive, from the wireless communication device in response to one or more of the plurality of random access preambles, one or more random access response (RAR) messages in one or more beam directions of the plurality of beam directions.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 illustrates a random access message transmission configuration according to embodiments of the present disclosure.

DETAILED DESCRIPTION

Figure 1:
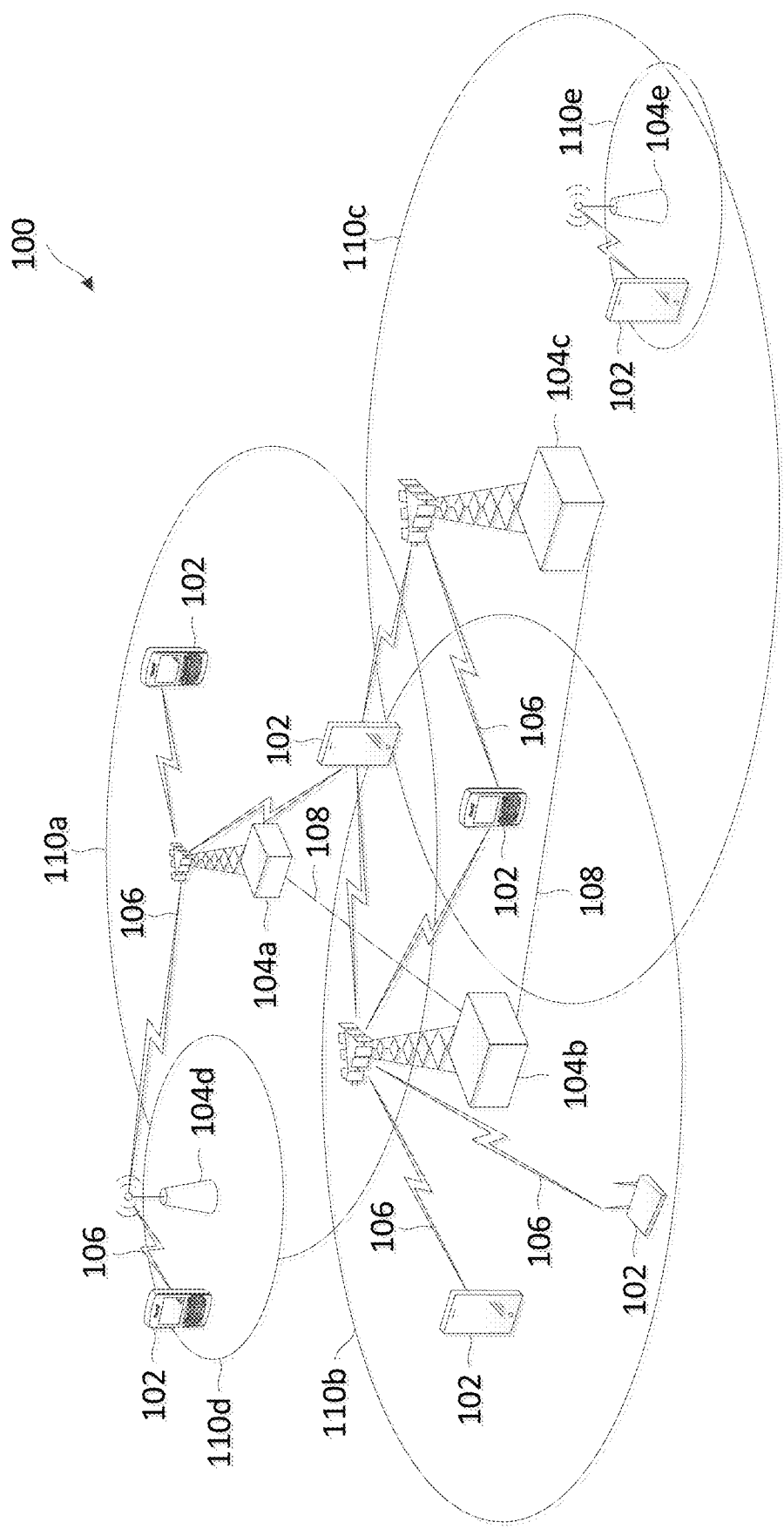
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWav bands) network.

The present disclosure describes an improved random access procedure. The disclosed embodiments define a transmission configuration for random access message transmission in a finer granularity than a system nominal subframe. For example, a system nominal subframe may be divided into a plurality of slots and each slot may be further divided into a plurality of mini-slots, where each mini-slot may include at least one symbol. A random access message may be transmitted in one or more mini-slots or one or more slots instead of carrying in an entire subframe in one direction due to hybrid beamforming constraints. Further, the disclosed embodiments define various TDM schemes for sending control and data of random access messages in multiple beam directions. The BSs may include additional configuration parameters to notify the UE before random access procedures. Thus, the disclosed embodiments can reduce system latency and improve resource utilization efficiency. In addition, the disclosed embodiments can provide at least some UEs with multiple random access opportunities over multiple beam directions per random access attempt. For example, instead of sending a single random access preamble over a single beam direction, a UE may send multiple random access preambles over multiple beam directions before monitoring for RARs. Thus, the UE has a higher chance of receiving a RAR. The BSs may include additional configuration parameters and/or limits for usages of the multiple random access opportunities.

FIG. 1 illustrates a wireless communication network 100 according to embodiments of the present disclosure. The network 100 may include a number of UEs 102, as well as a number of BSs 104. The BSs 104 may include an Evolve Node B (eNodeB). A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. In an embodiment, the network 100 may employ a tone spacing of about 60 kilohertz (kHz) and a system nominal subframe duration of about 500 microseconds (μs). For example, communications in the network 100 may be performed in the form of radio frames. A radio frame may include a plurality of subframes. Each subframe may include a plurality of symbols spanning a frequency band. The frequency band may be in the sub-6 GHz range, the mmWav range, or any suitable frequency range. The network 100 may employ various transmission configurations. For example, each radio frame may include one or more subframes for downlink transmissions and one or more subframes for UL transmissions.

The BSs 104 may broadcast synchronization signals, beam reference signals, and system information over a plurality of directional beams. For example, the BSs 104 may transmit one or more primary synchronization signals (PSSs), secondary synchronization signals (SSSs), extended synchronization signals (ESS), and/or beam reference signals (BRSs) in each radio frame in each beam direction to facilitate synchronizations and beam measurements at the UEs 102. Some examples of system information may include physical layer information such as cell bandwidths and frame configurations, cell access information, and neighbor cell information. For example, the BSs 104 may broadcast the same system information in each beam direction periodically. The system information may be sent in the form of system information blocks (SIBs). The BSs 104 may transmit other reference signals in some periods within a radio frame to facilitate channel measurements and/or other additional measurements.

To access the network 100, a UE 102 may listen to the synchronization signals and/or the BRSs and measures the signal strengths of the received signals. The UE 102 may select a cell and a beam within the selected cell based on the signal measurements, download the system information, and perform an access procedure, for example, a contention-based random access procedure, to establish a connection with the BS 104 in the selected cell. After establishing the connection, the UE 102 may register with the BS 104 and enter a normal operation stage, where operational data may be exchanged between the BS 104 and the UE 102.

Figure 2:
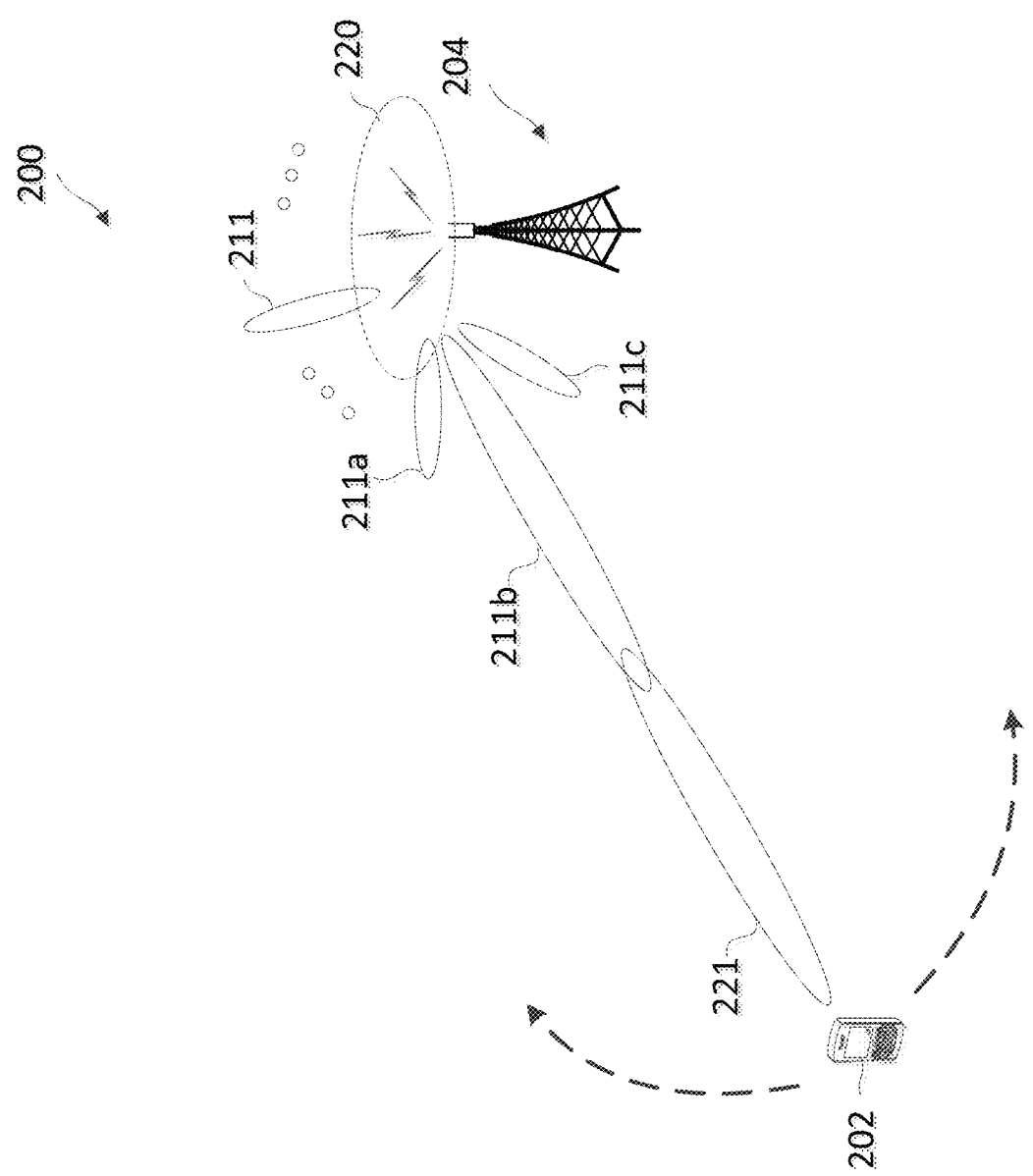
FIG. 2 illustrates a random access scheme in a wireless communication network according to embodiments of the present disclosure.

FIG. 2 illustrates a random access scheme in a wireless communication network 200 according to embodiments of the present disclosure. The network 200 corresponds to a portion of the network 100. FIG. 2 illustrates one BS 204 and one UE 202 for purposes of simplicity of discussion, though it will be recognized that embodiments of the present disclosure may scale to many more UEs 202 and/or BSs 204.

The BS 204 corresponds to one of the BSs 104. The UE 202 corresponds to one of the UEs 102. The UE 202 and the BS 204 may communicate with each other at any suitable frequencies.

In FIG. 2, the BS 204 sends synchronization signals, BRSs, and system information over a plurality of directional beams 211 in a plurality of directions as shown by the dashed oval 220. To access the network 200, the UE 202 listens to the synchronization signals and/or the BRSs and selects a beam for performing a random access procedure. For example, the UE 202 can receive the beams 211a, 211b, and 211c and selects the beam 211b for the random access. The UE 202 sends a random access preamble over a beam 221 in the beam direction of the beam 211b and monitors for a RAR from the BS 204. Upon detecting the random access preamble, the BS 204 sends a RAR over the beam 211b in the same beam direction at which the random access preamble is received. The BS 204 sends the RAR over the beam 211b using an entire subframe. This is resource inefficient when a large bandwidth is available. In addition, by the time the BS 204 sends the RAR, the UE 202 may have moved to a different location away from the beam 211b as shown by the dashed arrows. Thus, the UE 202 may fail to receive the RAR from the beam 211b. An additional cause of RAR failure may be due to beam correspondence. Although the UE 202 may retry for another random access attempt after waiting for a period of time (e.g., a backoff period), the retry adds additional latency. Thus, sending a single random access preamble over a single beam direction per random access attempt may not be robust.

Figure 3:
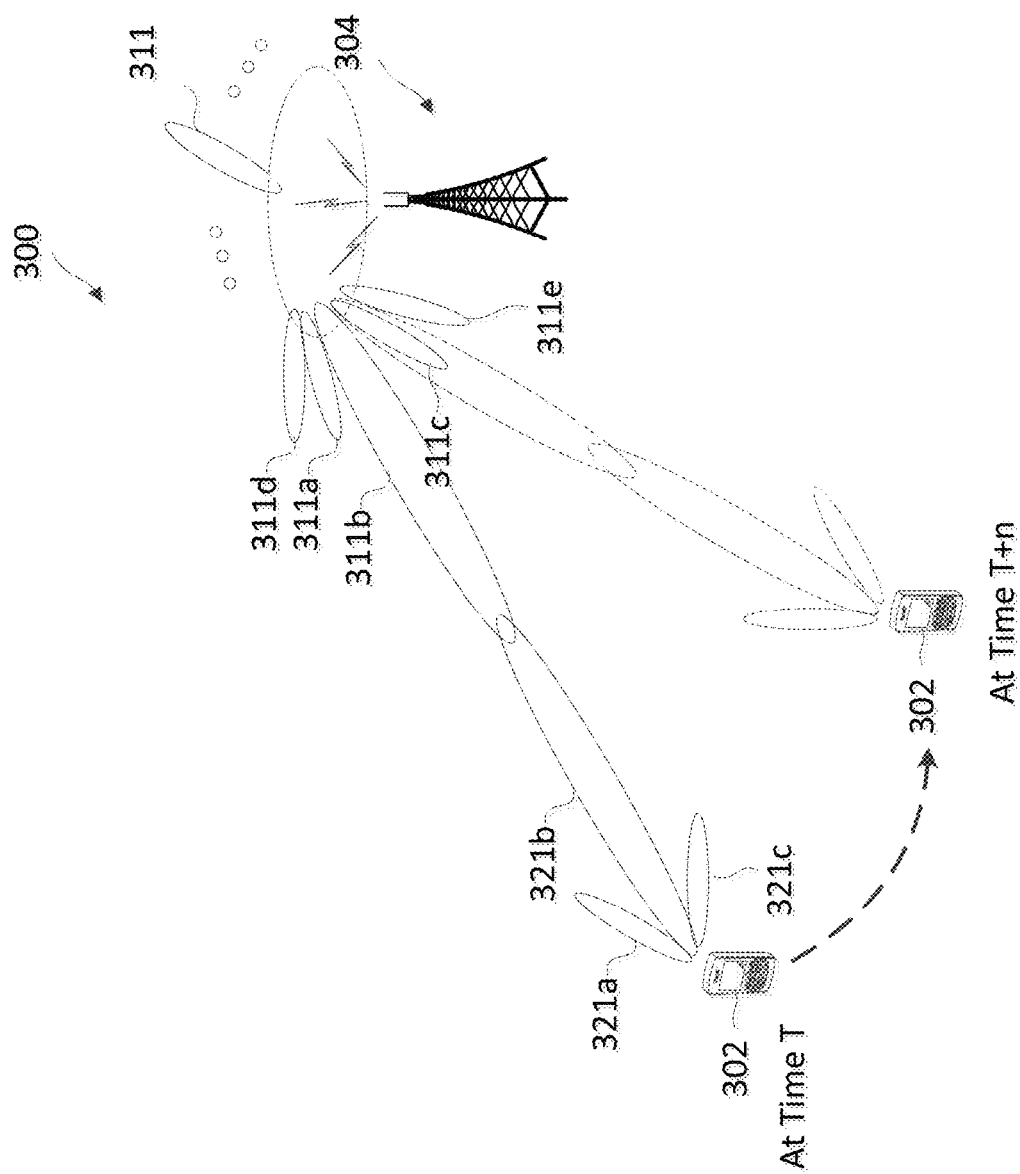
FIG. 3 illustrates an improved random access scheme in a wireless communication network according to embodiments of the present disclosure.

FIG. 3 illustrates an improved random access scheme in a wireless communication network 300 according to embodiments of the present disclosure. The network 300 is similar to the networks 100 and 200. FIG. 3 illustrates one BS 304 and one UE 302 for purposes of simplicity of discussion, though it will be recognized that embodiments of the present disclosure may scale to many more UEs 302 and/or BSs 304. The BS 304 and the UE 302 may be substantially similar to the BSs 104 and 204 and the UEs 102 and 202, respectively. For example, the BS 304 may send synchronization signals, BRSs, and system information over a plurality of directional beams 311 in a plurality of beam directions as shown by the dashed oval. However, the BS 304 sends an additional transmission configuration for sending random access related messages such as RARs and/or connection requests in the network 300. In an embodiment, the BS 304 may indicate the transmission configuration in the form of a SIB. The transmission configuration defines transmission regions for sending random access related messages. A transmission region may be a subdivision of a system nominal subframe instead of an entire subframe. The transmission configuration is described in greater detail herein.

To access the network 300, the UE 302 listens to the synchronization signals and/or BRSs and selects one or more beams, for example, based on receive quality, for performing a random access procedure. For example, the UE 302 can receive the beams 311a, 311b, 311c, 311d, and 311e and selects the beams 311a, 311b, and 311c for the random access. The UE 302 forms beams 321a, 321b, and 321c in the directions of the beams 311a, 311b, and 311c, respectively. For example, at a time T, the UE 302 sends a random access preamble over each of the beams 321. After sending the random access preambles, the UE 302 monitors for RARs from the BS 304. Upon detection of the random access preambles, the BS 304 may respond to each detected random access preamble by sending a RAR in the same direction or the same port as the random access preamble is detected or in the same direction or the same port as the PSS/SSS/BRS that can be received by the UE. For example, the BS 304 sends a RAR over each of the beams 311a, 311b, and 311c in response to each of the random access preambles received from the beams 321a, 321b, and 321c, respectively. As an example, the BS 304 may send the RARs at a time T+n, where n is some unit time.

The UE 302 may travel to another location after sending the random access preambles as shown by the dashed arrow. For example, at time T+n, the UE 302 is at a location more aligned to the beam 311c as shown by the dashed beams and may not receive the beam 311b. Thus, the UE 302 may receive the RAR transmitted by the BS 304 over the beam 311c, but not over the beam 311b. Alternatively, the UE 302 may still fail to receive the RAR from the beam 311b without travelling, for example, due to beam correspondence, collision or a signal blockage, but may receive the RAR from the beam 311a or 311c. Thus, by allowing the UE 302 to send multiple random access preambles over multiple beams in a single random access attempt, the UE 302 is less likely to fail the random access due to mobility, collision, or signal blockage. In some embodiments, the BS 304 may configure rules and/or limits to control the random access procedures as described in greater detail herein.

Figure 4:
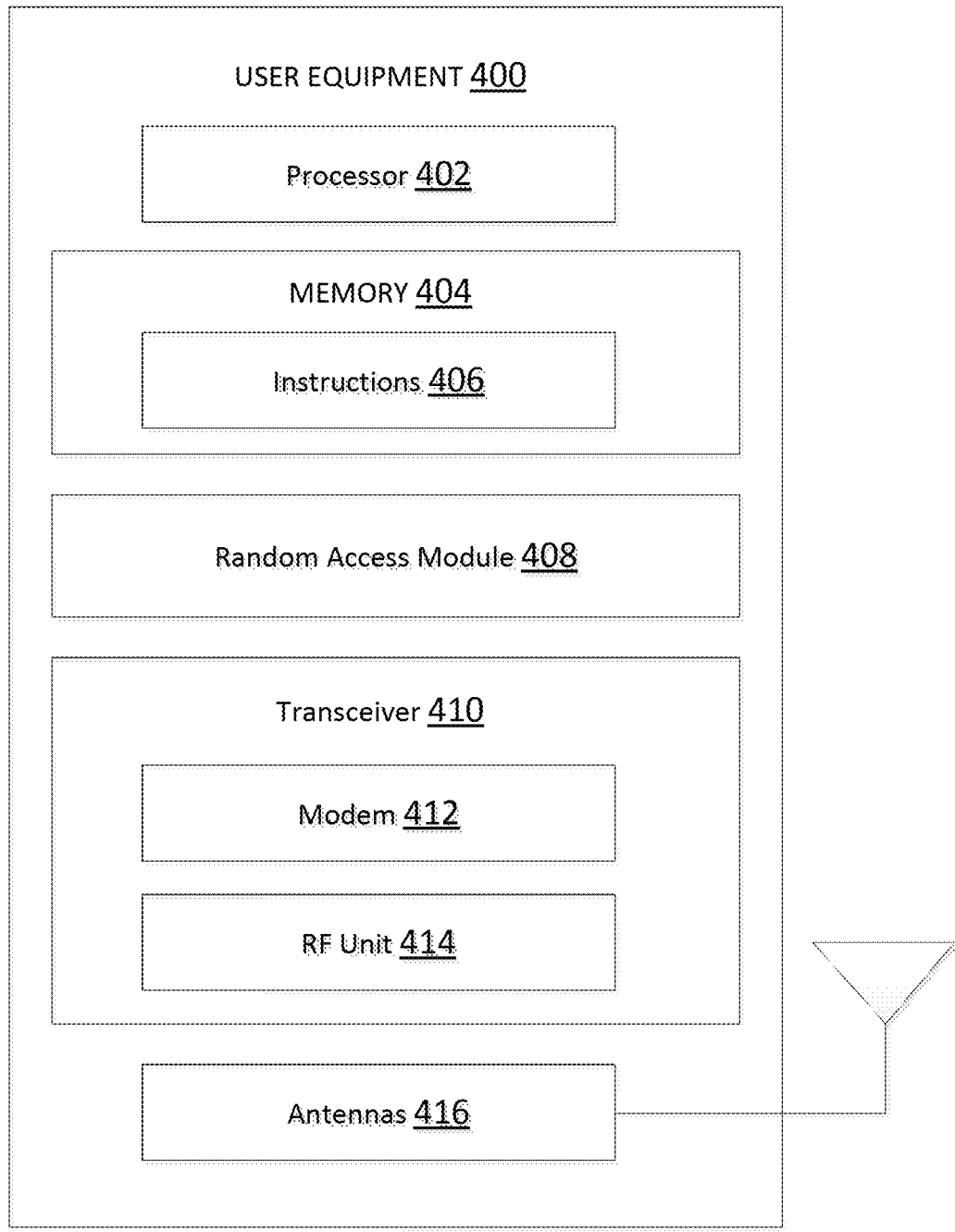
FIG. 4 is a block diagram of a user equipment (UE) according to embodiments of the present disclosure.

FIG. 4 is a block diagram of a UE 400 according to embodiments of the present disclosure. The UE 400 may be a UE 102, 202, 302 as discussed above. As shown, the UE 400 may include a processor 402, a memory 404, a random access module 408, a transceiver 410 including a modem subsystem 412 and a RF unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 302 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The random access module 408 may be used for various aspects of the present disclosure. For example, the random access module 408 is configured to select random access preamble sequences, initiate transmission of random access preambles, and monitor for RARs, initiate connection requests, and monitor for connection responses, as described in greater detail herein.

As shown, the transceiver 410 may include the modem subsystem 412 and the RF unit 414. The transceiver 410 can be configured to communicate bi-directionally with other devices, such as the BSs 104, 204, and 304. The modem subsystem 412 may be configured to modulate and/or encode the data from the memory 404 and/or the random access module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102 or a BS 104. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 102 to enable the UE 102 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of a random access preamble or a connection request according to embodiments of the present disclosure. The antenna 416 may further receive data messages transmitted from other devices. This may include, for example, reception of a RAR and a connection response according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416

Figure 5:
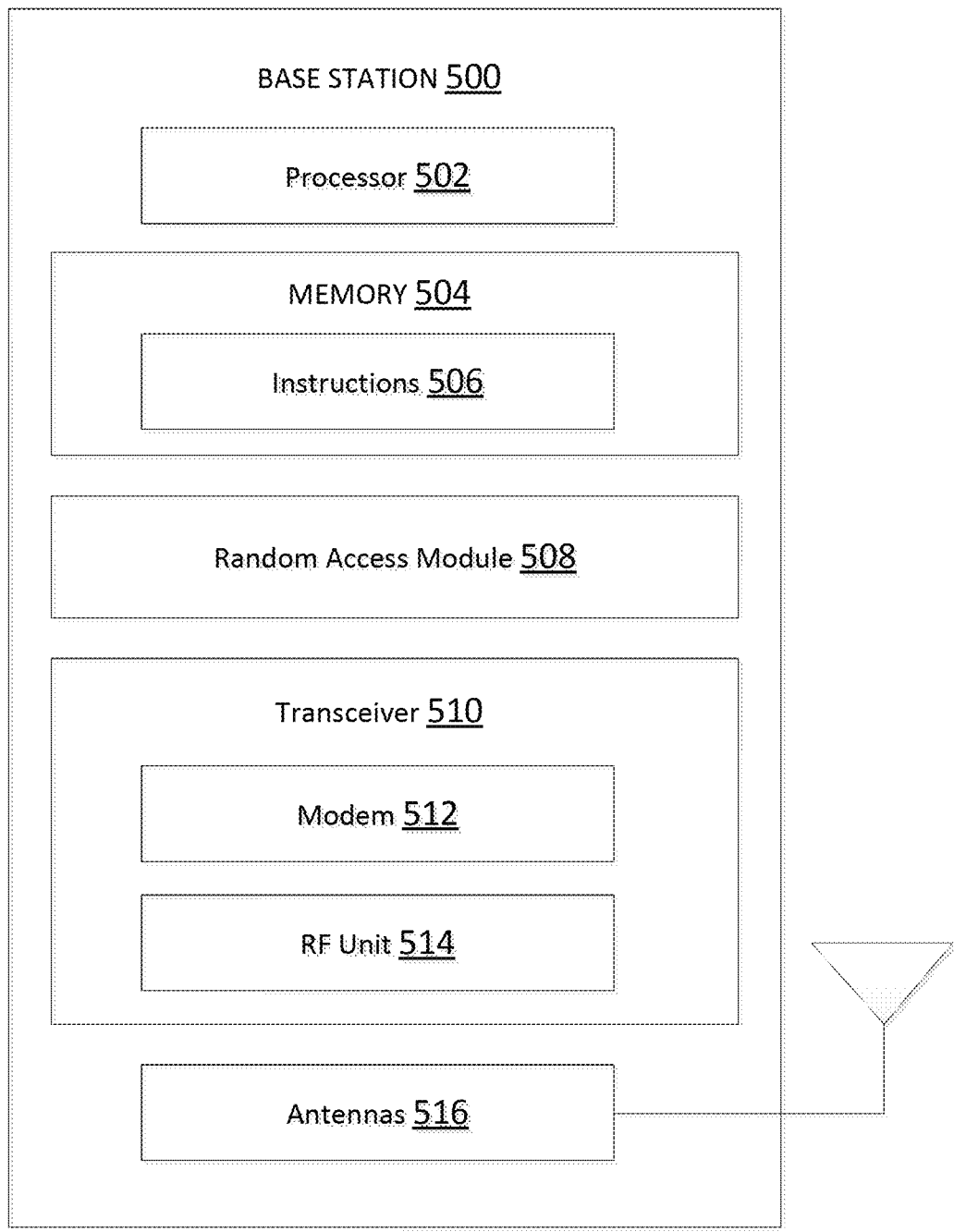
FIG. 5 illustrates a block diagram of a base station (BS) according to embodiments of the present disclosure.

FIG. 5 illustrates a block diagram of an exemplary BS 500 according to embodiments of the present disclosure. The BS 500 may be a BS 104, 204, or 304 as discussed above. A shown, the BS 500 may include a processor 502, a memory 504, a random access module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The random access module 508 may be used for various aspects of the present disclosure. For example, the random access module 508 may monitor and detect random access preambles, generate RARs in response to detected random access preambles, monitor for connection requests, and generate connection responses in response to detected connection requests.

As shown, the transceiver 510 may include the modem subsystem 512 and the RF unit 514. The transceiver 510 can be configured to communicate bi-directionally with other devices, such as the UEs 102, 202, and 302 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 102. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 104 to enable the BS 104 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
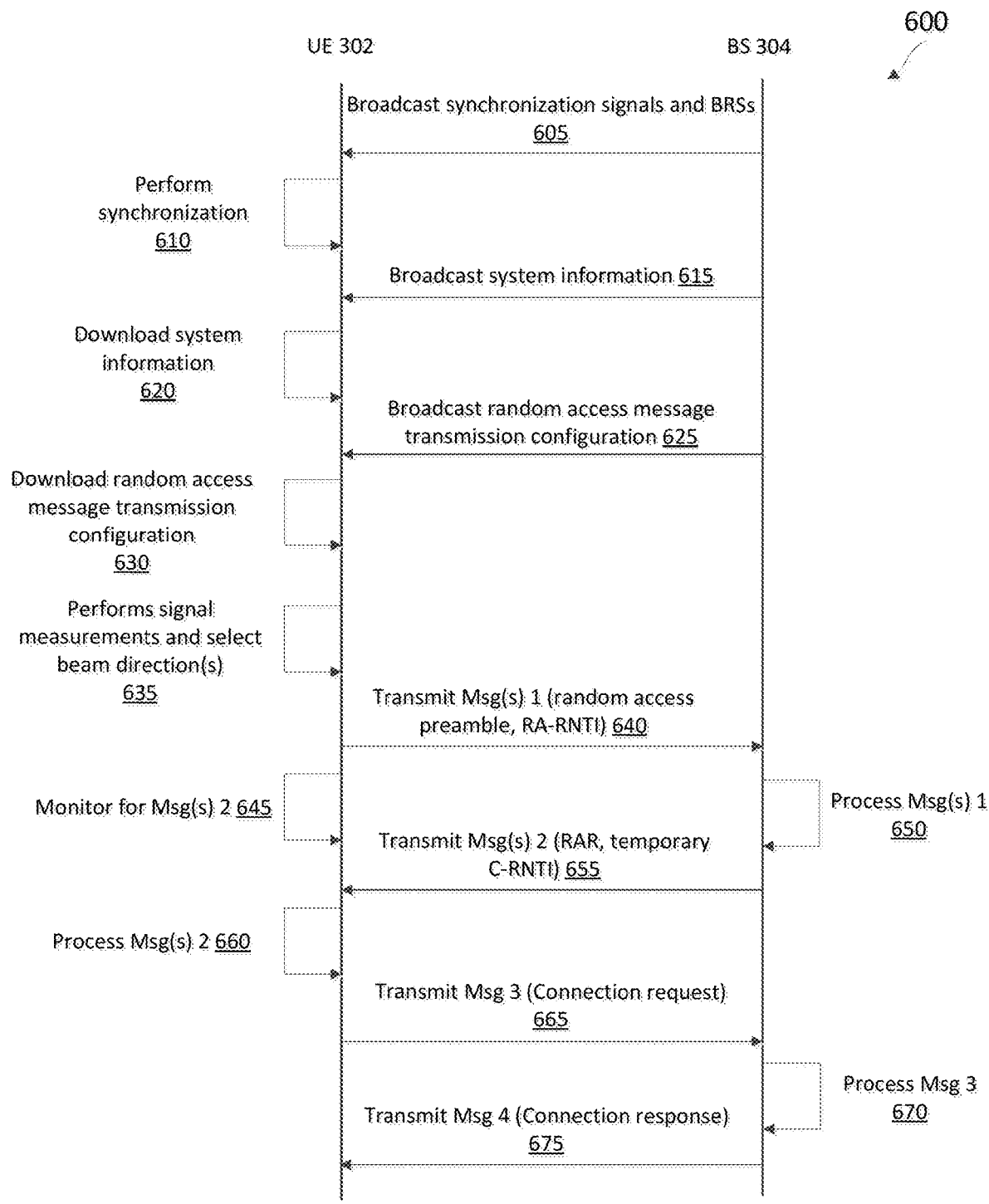
FIG. 6 is a protocol diagram of a method of performing a random access procedure according to embodiments of the present disclosure.

FIG. 6 is a protocol diagram of a method 600 of performing a random access procedure according to embodiments of the present disclosure. Steps of the method 600 can be executed by computing devices (e.g., a processor, processing circuit, and/or other suitable component) of wireless communication devices, such as the BSs 104, 204, 304, and 500 and the UEs 102, 202, 302, and 400. The method 600 can be better understood with reference to FIG. 3. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS 304 and one UE 302 for purposes of simplicity of discussion, though it will be recognized that embodiments of the present disclosure may scale to many more UEs 302 and/or BSs 304.

At step 605, the BS 304 broadcasts synchronization signals and BRSs over a plurality of directional beams (e.g., the beams 311). At step 610, the UE 302 performs synchronization to synchronize to the BS 304 based on the synchronization signals and the BRSs. For example, the UE 302 can receive a number of the beams (e.g., the beams 311a, 311b, 311c, 311d, and 311e)

At step 615, the BS 304 broadcasts system information over the plurality of directional beams. System information may include cell access related information, a channel configuration, a physical random access (PRACH) configuration, and/or neighboring cell information. The PRACH configuration may indicate sequences, formats, and/or resources for random access preamble transmissions. For example, the BS 304 may assign some portions of some subframes for random access preamble transmissions. At step 620, the UE 302 downloads the system information.

At step 625, the BS 304 broadcast random access message transmission configuration over the plurality of directional beams. The random access message transmission configuration may include starting times and ending times of various channels, such as control and data channels for uplink and downlink, and numerologies (e.g., tone spacing, subframe timing, and symbol timing) that define the various channels. In an embodiment, the starting times and ending times of the various channels are indicated in units of a fraction or subdivision of a nominal subframe as described in greater detail herein. The BS 304 may broadcast the synchronization signals, the BRSs, the system information, and/or the random access message transmission configuration periodically. At step 630, the UE 302 downloads the random access message transmission configuration. In some embodiments, the BS 304 may send the random access message transmission configuration based on a request from the UE 302.

At step 635, the UE 302 performs signal measurements based on the received broadcast signals and selects one or more beams for random. For example, the UE 302 selects multiple beams (e.g., the beams 311a, 311b, and 311c).

At step 640, the UE 302 forms beams (e.g., the beams 321a, 321b, and 321c) in the directions of the selected beams and sends a message 1 carrying a random access preamble over each of the beams according to the PRACH configuration. For example, the UE 302 sends a first, second, and third random access preambles over the beams 321a, 321b, and 321c, respectively. The first, second, and third random access preambles may be of different random access preamble sequences or the same random access preamble sequence.

At step 645, after sending the messages 1, the UE 302 monitors for messages 2 from the BS 304 within RAR windows. For example, the UE 302 sends a random access preamble in mini-slot I of $K^{th}$ subframe, a corresponding RAR window begins at mini-slot starting J of $(N+K)^{th}$ subframe and spans a duration of L, where N may be greater than or equals 0 and J and L may be defined in one of the SIBs broadcasted by the BS 304 during the step 615. The UE 302 may monitor for a RAR based on a random access identifier (ID) to identify whether a received RAR is a response to a random access preamble transmitted by the UE 302. The random access ID for a particular sent random access preamble can be derived based on the frequency-time resource used by the UE 302 to send the particular random access preamble. The random access IDs of the random access preambles are independent of each other. In the context of LTE, the random access IDs are referred to as random access-radio network temporary identifiers (RA-RNTIs).

At step 650, upon detecting the messages 1 (e.g., from the beams 321a, 321b, and 321c), the BS 304 processes the messages 1. For each detected random access preamble, the BS 304 may determine uplink transmission timing of the UE 302 and assign a UL resource and a temporary ID to the UE 302 for sending a subsequent message. The BS 304 may assign the UL resources based on the random access message transmission configuration, for example, the tone spacing, the symbol timing, the starting time, and/or the ending time of the uplink control and data channels. The BS 304 identifies a next message (e.g., message 3) from the UE 302 by the temporary ID. In the context of LTE, the temporary IDs are referred to as temporary cell-radio network temporary identifiers (C-RNTIs).

At step 655, for each detected random access preamble, the BS 304 sends a message 2 carrying a RAR according to the random access message transmission configuration. For example, the BS 304 sends a first, second, and third RARs over the beam 311a, 311b, and 311c, respectively. The first, second, and third RARs are responses to the first, second, and third random access preambles received from the beams 321a, 321b, and 321c. Each RAR may be carried in one or more mini-slots or one or more slots. Each RAR may include a control portion and a data portion. The control portion is generated based on the random access ID of a corresponding random access preamble. The data portion carries a corresponding assigned resource, a corresponding assigned temporary ID, and corresponding timing advance information determined based on corresponding uplink transmission timing.

At step 660, upon detecting the messages 2, the UE 302 processes the messages 2. The UE 302 retrieves the assigned resources, the temporary ID, and the timing advance information from the messages 2.

At step 665, the UE 302 sends a message 3, for example, carrying a connection request to the BS 304. For example, the UE 302 may select one of the received beams and respond to the RAR received from the selected beam by forming a beam in the direction of the selected beam to carry the message 3. The message 3 may be sent according to the assigned resource, the temporary ID, the timing advancement information, and the random access message transmission configuration. Alternatively, the UE 302 may respond to more than one of the RARs. The message 3 may be carried in one or more mini-slots or one or more slots.

At step 670, upon receiving the message 3, the BS processes the message 3 and determines that the message 3 is sent in response to a RAR by the temporary ID. At step 675, the BS acknowledges the reception of the message 3 by sending a message 4, for example, carrying a connection response to the UE 302. The message 4 may be carried in one or more mini-slots or one or more slots. Subsequently, the UE 302 may continue to initiate a registration process with the BS 304.

In an embodiment, when the UE 302 sends multiple random access preambles at the step 640, the RAR windows of the multiple random access preambles may overlap. In one embodiment, the network may configure RA response window such that the RA response window of beams do not overlap. In another embodiment, the UE 302 may configure the transmissions of the multiple random access preambles such that the RAR windows have a minimal overlap. Thus, the UE 302 may monitor one beam at a time. In another embodiment, at step 645, the UE 302 may monitor one beam (e.g., the beam 321*a*) over a portion of a corresponding RAR window and switched to monitor another beam (e.g., the beam 321*b* or 321*c*) over a portion of anther RAR window. In another embodiment, at step 645, the UE 302 may choose to monitor the strongest beam (e.g., the beam 321*b* at time T or 321*c* at time T+n) over the RAR window corresponding to the strongest beam. In another embodiment, at step 645, the UE 302 may form a beam based on a union of beam directions (e.g., beams 321*a*, 321*b*, and 321*c*) used for the transmissions of the random access preambles such that the UE 302 may monitor all beam directions at the same time.

Figure 7:
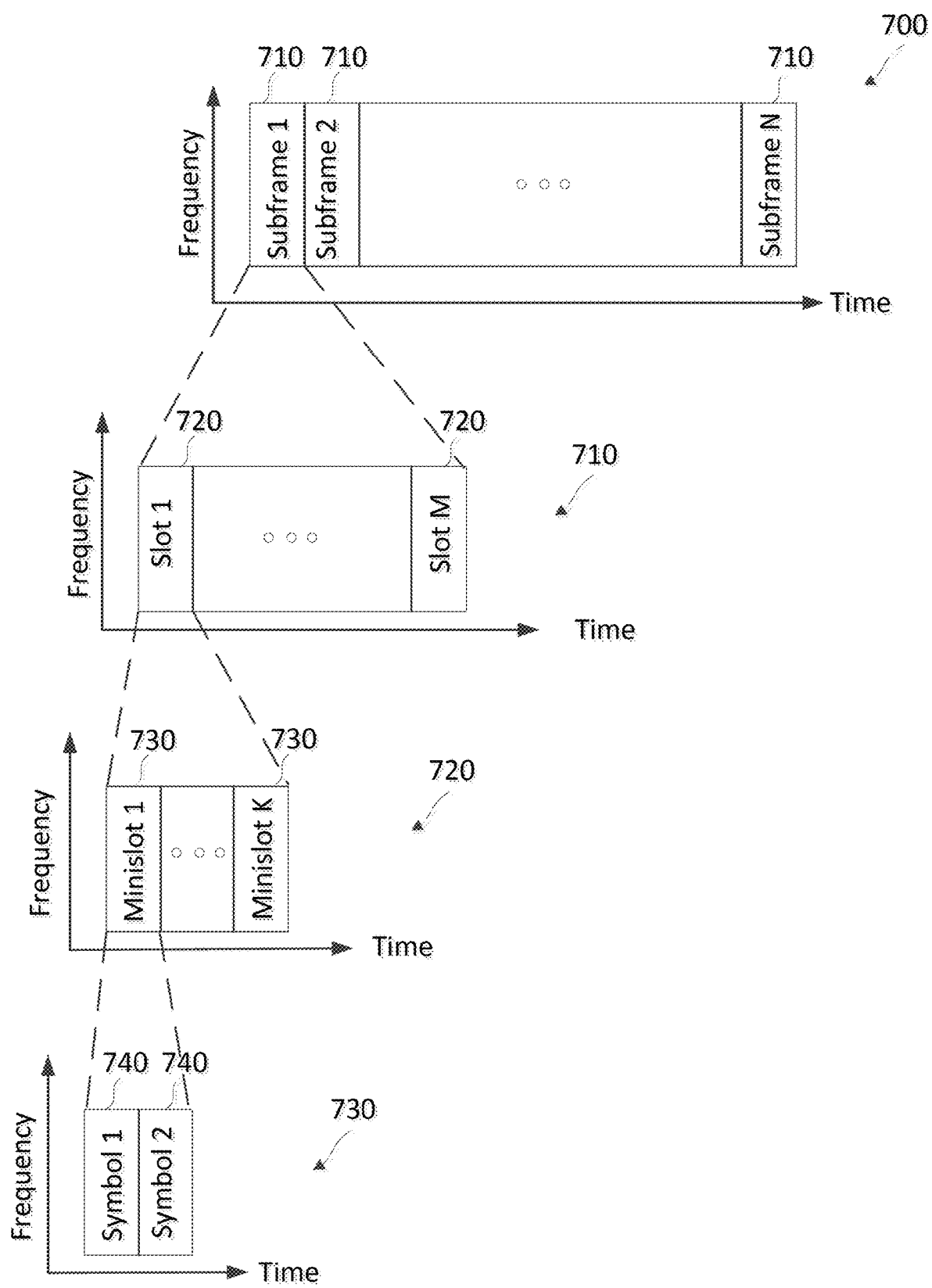
FIG. 7 illustrates a radio frame according to embodiments of the present disclosure.

FIG. 7 illustrates a radio frame 700 according to embodiments of the present disclosure. The radio frame 700 may be employed by the networks 100, 200, and 300 and the method 600. In particular, BSs such as the BSs 104, 204, and 304 and UEs such as the UEs 102, 202, and 302 may exchange data using the radio frame 700. In FIG. 7, the x-axes represent time in some constant units and the y-axes represent frequency in some constant units. The radio frame 700 includes N plurality of subframes 710 spanning in time and frequency. In an embodiment, a radio frame 700 may span a time interval of about 10 milliseconds (ms). Each subframe 710 includes M plurality of slots 720. Each slot 720 includes K plurality of min-slots 730. Each mini-slot 730 includes a minimum of about 2 symbols 740. N, M, and K may be any suitable positive integers. The subframes 710 are referred to as system nominal subframes, which may be used by the BSs or the UEs to send downlink data or uplink data, respectively. Since random access messages (e.g., messages 2 and 3) are small in size, the random access messages may be sent using a subdivision of a nominal subframe 710 instead of an entire subframe 710. For example, a random access message may be carried in one or more slots 720 or one or more mini-slots 730 or one or more symbols 740.

Figure 8:
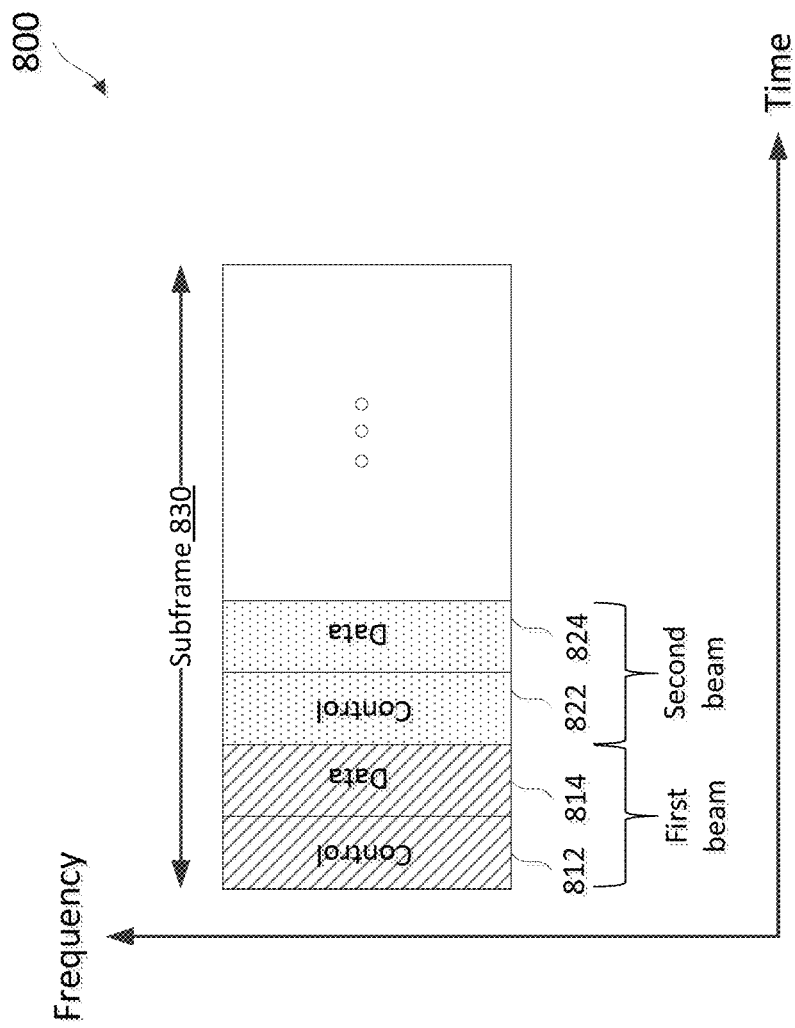
FIG. 8 illustrates a time-division multiplexing (TDM) scheme for transmitting control and data over multiple directional beams according to embodiments of the present disclosure.
Figure 9:
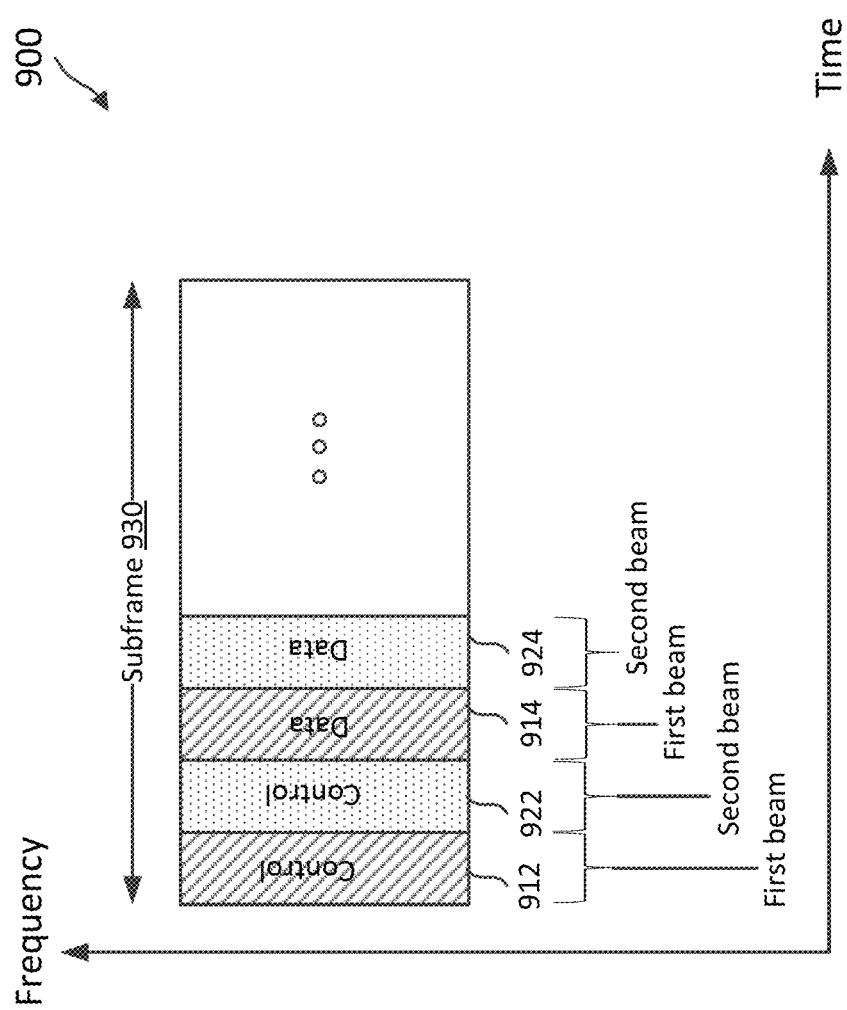
FIG. 9 illustrates a TDM scheme for transmitting control and data over multiple directional beams according to embodiments of the present disclosure.

FIGS. 8 and 9 illustrate transmission schemes for transmitting multiple messages over multiple directional beams. In FIGS. 8 and 9, the x-axis represents time in some constant units, for example, symbols or mini-slots or slots or sub frame and the y-axis represents frequency in some constant units, for example, resource elements or resource blocks. FIG. 8 illustrates a TDM scheme 800 for transmitting control and data over multiple directional beams such as the beams 211, 221, 311, and 321 according to embodiments of the present disclosure. The scheme 800 may be employed by the BSs 104, 204, and 304 or the UEs 102, 202, and 302 for transmitting random access related messages (e.g., messages 2 and/or 3). For example, a RAR message may include control and data, where the control indicates a location of the data within a subframe (e.g., the subframes 710) and the data indicates a UL grant, a temporary ID, and/or timing advance information for a next message. In the scheme 800, a BS may send a first control 812 of a first RAR over a first beam (e.g., the beam 311*a*), followed by a first data 814 of the first RAR over the first beam. The first control 812 may indicate a position or a starting time and ending time of the first data 814 within a subframe 830 similar to the subframes 710. After sending the first RAR, the BS switches to a second beam (e.g., the beam 311*b* or 311*c*) and sends a second control 822 of a second RAR over the second beam, followed by a second data 824 of the second RAR over the second beam. Similarly, the second control 822 may indicate a position or a starting time and an ending time of the second data 824 within the subframe 830. In some embodiments, the first RAR and the second RAR may be carried within a slot similar to the slots 720. Although the scheme 800 is described in the context of transmissions of messages 2 over two beams, the scheme 800 may be suitable for transmitting messages 3 and/or over any suitable number of beams.

FIG. 9 illustrates another TDM scheme 900 for transmitting control and data over multiple beams such as the beams 211, 221, 311, and 321 according to embodiments of the present disclosure. The scheme 900 may be employed by the BSs 104, 204, and 304 or the UEs 102, 202, and 302 for transmitting random access related messages (e.g., messages 2 and 3). In the scheme 900, a BS may send controls of multiple RARs, followed by sending data of the multiple RARs, where the BS sweeps through multiple beams when sending the controls and data. As shown, the BS may send a first control 912 of a first RAR over a first beam (e.g., the beam 311*a*), followed by a first control 922 of a second RAR over a second beam (e.g., the beam 311*b* or 311*c*). After sending the controls, the BS sends a first data 914 of the first RAR over the first beam, followed by a second data 924 over the second beam. The first control 912 may indicate the position of the first data 914 within a subframe 930 similar to the subframe 710. In some embodiments, the first RAR and the second RAR may be carried within a slot similar to the slots 720. The second control 922 may indicate the position of the second data 924 within the subframe 930. Although the scheme 900 is described in the context of transmissions of messages 2, the scheme 900 may be suitable for transmitting messages 3.

FIG. 10 illustrates a random access message transmission configuration 1000 according to embodiments of the present disclosure. The transmission configuration 1000 is used by a BS such as the BSs 104 and 304 to indicate information related to transmissions of random access messages (e.g., messages 2 and 3) as shown in the step 625 of the method 600. The transmission configuration 1000 can be transmitted in the form of a SIB or any other suitable format. The transmission configuration 1000 can be indicated in a separate SIB or integrated with other system information in the same SIB. The transmission configuration 1000 may include a physical downlink shared channel (PDSCH) field 1010, a physical uplink shared channel (PUSCH) field 1020, a physical downlink control channel (PDCCH)_position field 1030, a PDSCH_Numerology field 1040, a PUSCH_Numerology field 1050, a uplink control information (UCI) field 1060, a Reference_Numerology field 1070, a Maximum_Opportunities field 1080, and a PL_threshold field 1090. The fields 1010-1090 may include have any suitable lengths. In an embodiment, the transmission configuration 1000 may include one or more of the fields 1010-1090.

The PDSCH field 1010 includes a PDSCH_Start_Time field 1012 and a PDSCH_End_Time field 1014. The PDSCH_Start_Time field 1012 indicates a starting time of a PDSCH transmission time interval. The PDSCH_End_Time field 1014 indicates an ending time of the PDSCH transmission time interval. The PDSCH transmission time interval may be a subdivision of a duration of a system nominal subframe (e.g., the subframes 710). The PDSCH_Start_Time field 1012 and the PDSCH_End_Time field 1014 may be represented by slot (e.g., the slots 720) indices or mini-slot (e.g., the mini-slots 730) indices within a system nominal subframe. For example, the BS 304 may send a data portion such as the data 814, 824, 914, 924 of a RAR message in the PDSCH transmission time interval.

The PUSCH field 1020 includes a PUSCH_Start_Time field 1022 and a PUSCH_End_Time field 1024. The PUSCH_Start_Time field 1022 indicates a starting time of a PUSCH transmission time interval. The PUSCH_End_Time field 1024 indicates an ending time of the PUSCH transmission time interval. The PUSCH transmission time interval may be a subdivision of a duration of a system nominal subframe. The PUSCH_Start_Time field 1022 and the PUSCH_End_Time field 1024 may be represented by slot indices or mini-slot indices within a system nominal subframe. For example, the BS 304 may assign a UL resource for the UE 302 to transmit the message 3 according to the PUSCH transmission time interval.

The PDCCH_Position field 1030 indicates a position of a PDCCH within a system nominal subframe. In some embodiments, the PDCCH spans a fixed time interval. For example, the BS 304 may send a control portion such as the controls 812, 822, 912, and 922 of a RAR message in the PDCCH time interval according to the PDCCH_Position field 1030.

The PDSCH_Numerology field 1040 indicates information associated with the configuration of the PDSCH. For example, the PDSCH_Numerology field 1040 may indicate a tone spacing, a number of symbols, and a symbol duration in the PDSCH.

The PUSCH_Numerology field 1050 indicates information associated with the configuration of the PUSCH. For example, the PUSCH_Numerology field 1050 may indicate a tone spacing, a number of symbols, and a symbol duration in the PUSCH. The PDSCH numerology and the PUSCH numerology may be independent of each other.

The UCI field 1060 includes a UCI_Start_Time field 1062 and a UCI_End_Time field 1064. The UCI_Start_Time field 1062 indicates a starting time of a UCI transmission time interval. The UCI_End_Time field 1064 indicates an ending time of the UCI transmission time interval. The UCI transmission time interval is used for sending control information within a PUSCH transmission time interval. For example, the UE 302 may send a UL control according to the UCI transmission time interval.

The Reference_Numerology field 1070 indicates information associated with the configuration of the system nominal subframe. For example, the Reference_Numerology field 1070 may indicate that a system nominal subframe (e.g., the subframe 710) has a tone spacing of 60 GHz, a duration of 50 μs, and includes about 14 symbols. The PDSCH numerology and the PUSCH numerology may be different from the reference numerology.

The Maximum_Opportunities field 1080 indicates a maximum allowable number of random access opportunities per random access attempt. For example, when the Maximum_Opportunities field 1080 indicates a value of 3, the UE 302 may send up to 3 random access preambles in three different beam directions at the step 640 before monitoring for RARs. Thus, the BS 304 can control the success rates of random access preambles by allowing UEs to employ multiple random access opportunities, but limiting unnecessary transmissions that can increase the rate of collisions.

The PL_threshold field 1090 indicates a UE-to-BS PL threshold that a UE needs to meet before using multiple random access opportunities. For example, the UE 302 may check that the PL threshold is met before sending multiple random access preambles over multiple beams at the step 640. Thus, the BS 304 can control the resource utilization by allowing UEs with high PLs to use multiple random access opportunities and restricting UEs with low PLs from using multiple random access opportunities. It should be noted that the fields 1010-1090 may be organized as shown or alternatively configured to achieve similar functionalities.

Figure 11:
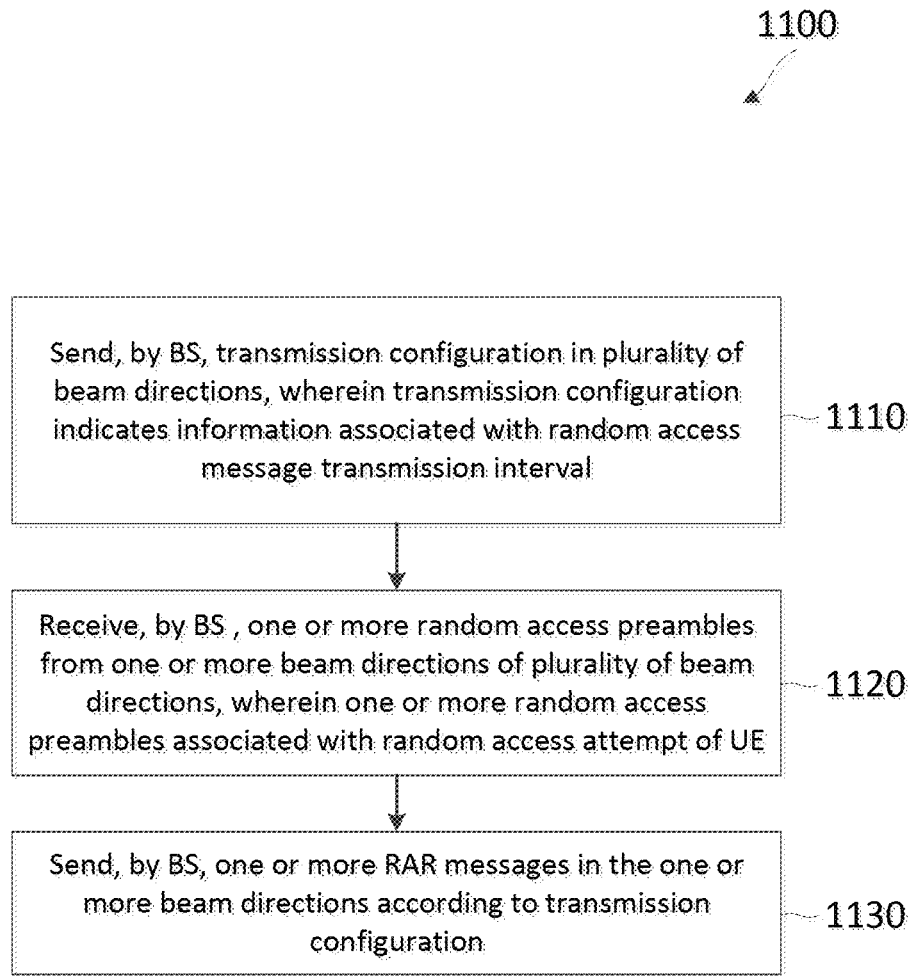
FIG. 11 is a flow diagram of a method of performing a random access procedure according to embodiments of the present disclosure.

FIG. 11 is a flow diagram of a method 1100 of performing a random access procedure according to embodiments of the present disclosure. Steps of the method 1100 can be executed by a computing device (e.g., a processor, processing circuit, and/or other suitable component) of a wireless communication device, such as the BSs 104, 304, and 500. The method 1100 may employ similar mechanisms as in the improved random access scheme described with respect to FIG. 3 and the method 600. The method 1100 can be better understood with reference to FIG. 3. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes sending, by a BS (e.g., the BS 304), a transmission configuration (e.g., the transmission configuration 1000) in a plurality of beam directions (e.g., over the beams 311), wherein the transmission configuration indicates information associated with a random access message transmission interval (e.g., the fields 1010, 1020, or 1060). For example, the random access message transmission interval spans less than a system nominal subframe (e.g., the subframes 710). The transmission configuration may indicate one or more of the fields 1010-1090.

At step 1120, the method 1100 includes receiving, by the BS, one or more random access preambles (e.g., messages 1) from one or more beam directions (e.g., over the beams 321a, 321b, and 321c) of the plurality of beam directions, wherein the one or more random access preambles are associated with a random access attempt of a UE (e.g., UE 302).

At step 1130, the method 1100 includes sending, by the BS, one or more RAR messages (e.g., messages 2) in the one or more beam directions according to the transmission configuration. The BS sends the one or more RAR messages in response to the one or more random access preambles of the random access attempt. For example, the BS may send a control portion and data portion of each RAR message according to the TDM scheme 800 or 900, the PDCCH_position field 1030, and/or the PDSCH field 1010. The control portion and/or the data portion may indicate UL resources and/or a numerology (e.g., for PUSCH and/or UCI) for the UE to send a subsequent message (e.g., message 3).

Figure 12:
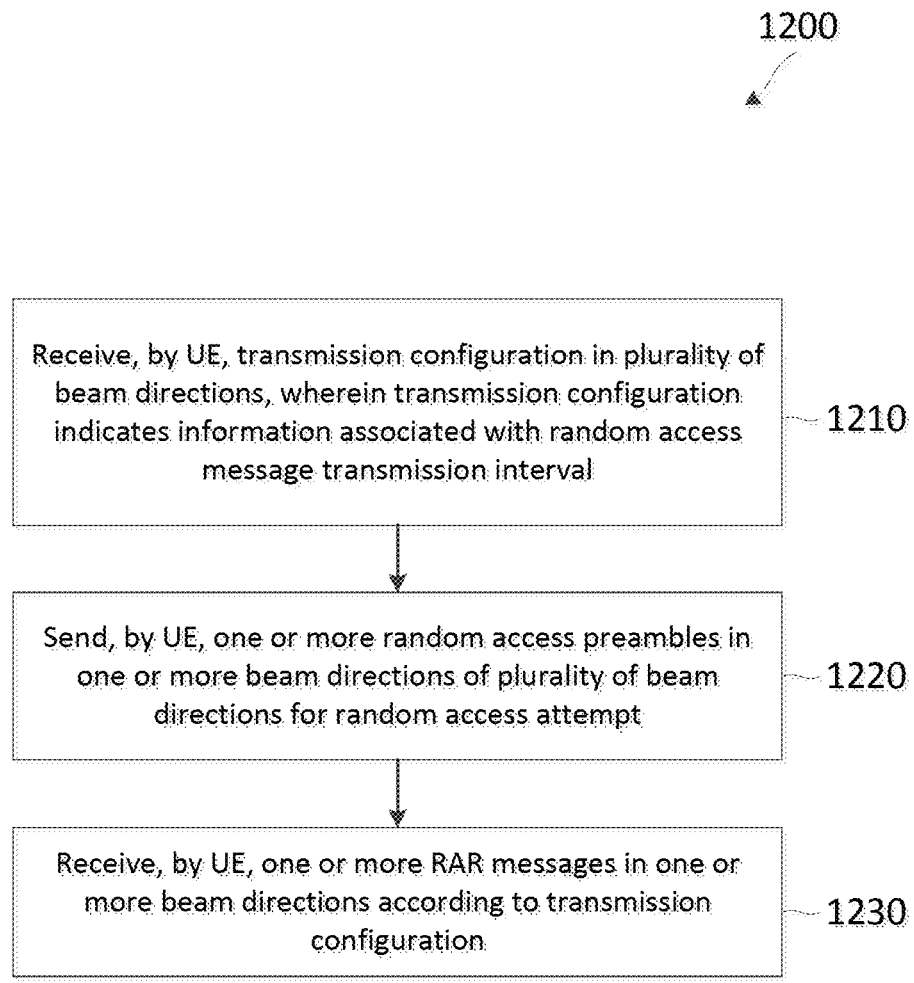
FIG. 12 is a flow diagram of a method of performing a random access procedure according to embodiments of the present disclosure.

FIG. 12 is a flow diagram of a method 1200 of performing a random access procedure according to embodiments of the present disclosure. Steps of the method 1200 can be executed by a computing device (e.g., a processor, processing circuit, and/or other suitable component) of a wireless communication device, such as the UEs 102, 302, and 400. The method 1200 may employ similar mechanisms as in the improved random access scheme described with respect to FIG. 3 and the method 600. The method 1200 can be better understood with reference to FIG. 3. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by a UE (e.g., the UE 302), a transmission configuration (e.g., the transmission configuration 1000) in a plurality of beam directions (e.g., over the beams 311a, 311b, 311c, 311d, and 311e), wherein the transmission configuration indicates information (e.g., the fields 1010-1090) associated with random access message transmission interval. For example, the random access message transmission time interval spans less than a system nominal subframe (e.g., the subframes 710).

At step 1220, the method 1200 includes sending, by the UE, one or more random access preambles (e.g., messages 1) in one or more beam directions (e.g., over the beams 321*a*, 321*b*, and 321*c*) of the plurality of beam directions for a random access attempt. For example, the UE may measure the quality or strength of each received beam and select one or more of the beams (e.g., the beams 311*a*, 311*b*, and 311*c*) based on the measurements.

At step 1230, the method 1200 includes receiving, by the UE, one or more RAR messages (e.g., messages 2) in the one or more beam directions according to the transmission configuration. For example, the one or more RAR messages are responses to the one or more random access preambles sent. Each RAR message may include a UL grant and timing advance information for sending a next random access message (e.g., message 3).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of performing a random access procedure in a wireless communication network, comprising receiving, by a base station (BS) from a user equipment (UE), a plurality of random access preambles from a plurality of beam directions, wherein each of the plurality of random access preambles is received from a different beam direction, and wherein the plurality of random access preambles are associated with multiple random access opportunities of a random access attempt, and sending, by the BS in response to the plurality of random access preambles, a plurality of random access response (RAR) messages in the plurality of beam directions.

In some embodiments, the sending the plurality of RAR messages includes sending, in a subframe, a first control information and a first data of a first RAR message of the plurality of RAR messages in a first beam direction of the plurality of beam directions, and sending, in the same subframe after sending the first control information and the first data, a second control information and a second data of a second RAR message of the plurality of RAR messages in a second beam direction of the plurality of beam directions. The sending the plurality of RAR messages includes sending, in a subframe, a first control information of a first RAR message of the plurality of RAR messages in a first beam direction of the plurality of beam directions, sending, in the same subframe after sending the first control information, a second control information of a second RAR message of the plurality of RAR messages in a second beam direction of the plurality of beam directions, sending, in the same subframe after sending the second control information, a first data of the first RAR message in the first beam direction, and sending, in the same subframe after sending the first data, a second data of the second RAR message in the second beam direction. The method further comprises sending, by the BS, a rule for transmissions of multiple random access preambles using multiple random access opportunities in different beam directions per random access attempt. The method further comprises sending, by the BS, one or more downlink beams carrying a transmission configuration in at least the plurality of beam directions, wherein the transmission configuration indicates information associated with a random access message transmission time interval spanning less than a system nominal subframe. The transmission configuration further indicates a reference numerology that defines the system nominal subframe, and wherein the reference numerology includes one or more of a tone spacing, a number of symbols, or a symbol duration.

Further embodiments of the present disclosure include a method of performing a random access procedure in a wireless communication network, including sending, by a user equipment (UE) to a base station (BS), a plurality of random access preambles in a plurality of beam directions, wherein each of the plurality of random access preambles is transmitted in a different beam direction, and wherein the plurality of random access preambles are associated with multiple random access opportunities of a random access attempt, and receiving, by the UE from the BS in response to one or more of the plurality of random access preambles, one or more random access response (RAR) messages in one or more beam directions of the plurality of beam directions.

In some embodiments, each RAR message spans a mini-slot or a slot. The receiving the one or more RAR messages comprises receiving, in a subframe, a first control information and a first data of a first RAR message of the one or more RAR messages in a first beam direction of the one or more beam directions, and receiving, in the same subframe after receiving the first control information and the first data, a second control information and a second data of a second RAR message of the one or more RAR messages in a second beam direction of the one or more beam directions. The receiving the one or more RAR messages includes receiving, in a subframe, a first control information of a first RAR message of the one or more RAR messages in a first beam direction of the one or more beam directions, receiving, in the same subframe after receiving the first control information, a second control information of a second RAR message of the one or more RAR messages in a second beam direction of the one or more beam directions, receiving, in the same subframe after receiving the second control information, a first data of the first RAR message in the first beam direction, and receiving, in the same subframe after receiving the first data, a second data of the second RAR message in the second beam direction. The method further comprises receiving, by the UE from the BS, a rule for transmitting multiple random access preambles using multiple random access opportunities in different beam directions per random access attempt prior to RAR message monitoring, and determining, by the UE, whether the UE satisfies the rule, wherein the plurality of random access preambles are transmitted when the UE is determined to satisfy the rule. The method further includes monitoring, by the UE, for a first RAR message of the one or more RAR messages in a first beam direction of the plurality of beam directions, and monitoring, by the UE, for a second RAR message of the one or more RAR messages in a second beam direction of the plurality of beam directions. The method further includes determining, by the UE, whether a first beam direction of the plurality of beam directions has a higher reception quality than a second beam direction of the plurality of beam directions, and monitoring for a first RAR message of the one or more RAR messages in the first beam direction in a RAR window associated with the first RAR message when the first beam direction is determined to have the higher reception quality than the second beam direction. The method further includes configuring a beam in at least a first beam direction and a second beam direction of the plurality of beam directions to monitor for the one or more RAR messages. The method further includes receiving, by the UE from the BS, a transmission configuration indicating information associated with a random access message transmission time interval that is less than a system nominal subframe.

Further embodiments of the present disclosure include an apparatus comprising a receiver configured to receive, from a wireless communication device, a plurality of random access preambles from a plurality of beam directions, wherein each of the plurality of random access preambles is received from a different beam direction, and wherein the plurality of random access preambles are associated with multiple random access opportunities of a random access attempt, and a transmitter configured to send, in response to the plurality of random access preambles, a plurality of random access response (RAR) messages in the plurality of beam directions.

In some embodiments, the transmitter is configured to send the plurality of RAR messages by sending, in a subframe, a first control information and a first data of a first RAR message of the plurality of RAR messages in a first beam direction of the plurality of beam directions, and sending, in the same subframe after sending the first control information and the first data, a second control information and a second data of a second RAR message of the plurality of RAR messages in a second beam direction of the plurality of beam directions. The transmitter is configured to send the plurality of RAR messages by sending, in a subframe, a first control information of a first RAR message of the plurality of RAR messages in a first beam direction of the plurality of beam directions, sending, in the same subframe after sending the first control information, a second control information of a second RAR message of the plurality of RAR messages in a second beam direction of the plurality of beam directions, sending, in the same subframe after sending the second control information, a first data of the first RAR message in the first beam direction, and sending, in the same subframe after sending the first data, a second data of the second RAR message in the second beam direction. The transmitter is further configured to send a rule for transmissions of multiple random access preambles using multiple random access opportunities in different beam directions per random access attempt. The transmitter is further configured to send one or more downlink beams carrying a transmission configuration in at least the plurality of beam directions, and wherein the transmission configuration indicates information associated with a random access message transmission time interval spanning less than a system nominal subframe. The transmission configuration further indicates a reference numerology that defines the system nominal subframe, and wherein the reference numerology includes one or more of a tone spacing, a number of symbols, or a symbol duration.

Further embodiments of the present disclosure include an apparatus comprising a transmitter configured to send, to a wireless communication device, a plurality of random access preambles in a plurality of beam directions, wherein each of the plurality of random access preambles is transmitted in a different beam direction, and wherein the plurality of random access preambles are associated with multiple random access opportunities of a random access attempt, and a receiver configured to receive, from the wireless communication device in response to one or more of the plurality of random access preambles, one or more random access response (RAR) messages in one or more beam directions of the plurality of beam directions.

In some embodiments, each RAR message spans a mini-slot or a slot. The receiver is further configured to receive the one or more RAR messages by receiving, in a subframe, a first control information and a first data of a first RAR message of the one or more RAR messages in a first beam direction of the one or more beam directions, and receiving, in the same subframe after receiving the first control information and the first data, a second control information and a second data of a second RAR message of the one or more RAR messages in a second beam direction of the one or more beam directions. The receiver is further configured to receive the one or more RAR messages by receiving, in a subframe, a first control information of a first RAR message of the one or more RAR messages in a first beam direction of the one or more beam directions, receiving, in the same subframe after receiving the first control information, a second control information of a second RAR message of the one or more RAR messages in a second beam direction of the one or more beam directions, receiving, in the same subframe after receiving the second control information, a first data of the first RAR message in the first beam direction, and receiving, in the same subframe after receiving the first data, a second data of the second RAR message in the second beam direction. The receiver is further configured to receive, from the wireless communication device, a rule for transmitting multiple random access preambles using multiple random access opportunities in different beam directions per random access attempt prior to RAR message monitoring. The apparatus further comprises a processor configured to determine whether the UE satisfies the rule, and wherein the plurality of random access preambles is transmitted when the UE is determined to satisfy the rule. The apparatus further comprises a processor configured to monitor for a first RAR message of the one or more RAR messages in a first beam direction of the plurality of beam directions, and monitor for a second RAR message of the one or more RAR messages in a second beam direction of the plurality of beam directions. The apparatus further comprises a processor configured to determine whether a first beam direction of the plurality of beam directions has a higher reception quality than a second beam direction of the plurality of beam directions, and monitoring for a first RAR message of the one or more RAR messages in the first beam direction in a RAR window associated with the first RAR message when the first beam direction is determined to have the higher reception quality than the second beam direction. The apparatus further comprises a processor configured to configure a beam in at least a first beam direction and a second beam direction of the plurality of beam directions to monitor for the one or more RAR messages. The receiver is further configured to receive, from the wireless communication device, a transmission configuration indicating information associated with a random access message transmission time interval that is less than a system nominal subframe.

Further embodiments of the present disclosure include a computer-readable medium having program code recorded thereon, the program code comprising code for causing a base station (BS) to receive, from a user equipment (UE), a plurality of random access preambles from a plurality of beam directions, wherein each of the plurality of random access preambles is received from a different beam direction, and wherein the plurality of random access preambles are associated with multiple random access opportunities of a random access attempt, and code for causing the BS to send, in response to the plurality of random access preambles, a plurality of random access response (RAR) messages in the plurality of beam directions.

In some embodiments, the code for sending the plurality of RAR messages is further configured to send, in a subframe, a first control information and a first data of a first RAR message of the plurality of RAR messages in a first beam direction of the plurality of beam directions, and send, in the same subframe after sending the first control information and the first data, a second control information and a second data of a second RAR message of the plurality of RAR messages in a second beam direction of the plurality of beam directions. The code for sending the plurality of RAR messages is further configured to send, in a subframe, a first control information of a first RAR message of the plurality of RAR messages in a first beam direction of the plurality of beam directions, send, in the same subframe after sending the first control information, a second control information of a second RAR message of the plurality of RAR messages in a second beam direction of the plurality of beam directions, send, in the same subframe after sending the second control information, a first data of the first RAR message in the first beam direction, and send, in the same subframe after sending the first data, a second data of the second RAR message in the second beam direction. The computer-readable medium further comprises code for causing the BS to send a rule for transmissions of multiple random access preambles using multiple random access opportunities in different beam directions per random access attempt. The computer-readable medium further comprises code for causing the BS to send one or more downlink beams carrying a transmission configuration in at least the plurality of beam directions, and wherein the transmission configuration indicates information associated with a random access message transmission time interval spanning less than a system nominal subframe. The transmission configuration further indicates a reference numerology that defines the system nominal subframe, and wherein the reference numerology includes one or more of a tone spacing, a number of symbols, or a symbol duration.

Further embodiments of the present disclosure a computer-readable medium having program code recorded thereon, the program code comprising code for causing a user equipment (UE) to send, to a base station (BS), a plurality of random access preambles in a plurality of beam directions, wherein each of the plurality of random access preambles is transmitted in a different beam direction, and wherein the plurality of random access preambles are associated with multiple random access opportunities of a random access attempt, and code causing the UE to receive, from the BS in response to one or more of the plurality of random access preambles, one or more random access response (RAR) messages in one or more beam directions of the plurality of beam directions.

In some embodiments, each RAR message spans a mini-slot or a slot. The code for receiving the one or more RAR messages is further configured to receive, in a subframe, a first control information and a first data of a first RAR message of the one or more RAR messages in a first beam direction of the one or more beam directions, and receive, in the same subframe after receiving the first control information and the first data, a second control information and a second data of a second RAR message of the one or more RAR messages in a second beam direction of the one or more beam directions. The code for receiving the one or more RAR messages is further configured to receive, in a subframe, a first control information of a first RAR message of the one or more RAR messages in a first beam direction of the one or more beam directions, receive, in the same subframe after receiving the first control information, a second control information of a second RAR message of the one or more RAR messages in a second beam direction of the one or more beam directions, receive, in the same subframe after receiving the second control information, a first data of the first RAR message in the first beam direction, and receive, in the same subframe after receiving the first data, a second data of the second RAR message in the second beam direction. The computer-readable medium further comprises code for causing the UE wherein the receiver is further configured to receive, from the BS, a rule for transmitting multiple random access preambles using multiple random access opportunities in different beam directions per random access attempt prior to RAR message monitoring, wherein the computer-readable medium further comprises code for causing the UE to determine whether the UE satisfies the rule, and wherein the plurality of random access preambles are transmitted when the UE is determined to satisfy the rule. The computer-readable medium further comprises code for causing the UE to monitor for a first RAR message of the one or more RAR messages in a first beam direction of the plurality of beam directions, and monitor for a second RAR message of the one or more RAR messages in a second beam direction of the plurality of beam directions. The computer-readable medium further comprises code for causing the UE to determine whether a first beam direction of the plurality of beam directions has a higher reception quality than a second beam direction of the plurality of beam directions, and monitor for a first RAR message of the one or more RAR messages in the first beam direction in a RAR window associated with the first RAR message when the first beam direction is determined to have the higher reception quality than the second beam direction. The computer-readable medium further comprises code for causing the UE to configure a beam in at least a first beam direction and a second beam direction of the plurality of beam directions to monitor for the one or more RAR messages. The computer-readable medium further comprises code for causing the UE to receive, from the BS, a transmission configuration indicating information associated with a random access message transmission time interval that is less than a system nominal subframe.

Further embodiments of the present disclosure include an apparatus comprising means for receiving, from a wireless communication device, a plurality of random access preambles from a plurality of beam directions, wherein each of the plurality of random access preambles is received from a different beam direction, and wherein the plurality of random access preambles are associated with multiple random access opportunities of a random access attempt, and means for sending, in response to the plurality of random access preambles, a plurality of random access response (RAR) messages in the plurality of beam directions.

In some embodiments, the means for sending the plurality of RAR messages is further configured to send, in a subframe, a first control information and a first data of a first RAR message of the plurality of RAR messages in a first beam direction of the plurality of beam directions, and send, in the same subframe after sending the first control information and the first data, a second control information and a second data of a second RAR message of the plurality of RAR messages in a second beam direction of the plurality of beam directions. The means for sending the plurality of RAR messages is further configured to send, in a subframe, a first control information of a first RAR message of the plurality of RAR messages in a first beam direction of the plurality of beam directions, send, in the same subframe after sending the first control information, a second control information of a second RAR message of the plurality of RAR messages in a second beam direction of the plurality of beam directions, send, in the same subframe after sending the second control information, a first data of the first RAR message in the first beam direction, and send, in the same subframe after sending the first data, a second data of the second RAR message in the second beam direction. The means for sending a rule for transmissions of multiple random access preambles using multiple random access opportunities in different beam directions per random access attempt. The apparatus further comprises means for sending one or more downlink beams carrying a transmission configuration in at least the plurality of beam directions, and wherein the transmission configuration indicates information associated with a random access message transmission time interval spanning less than a system nominal subframe. The transmission configuration further indicates a reference numerology that defines the system nominal subframe, and wherein the reference numerology includes one or more of a tone spacing, a number of symbols, or a symbol duration.

Further embodiments of the present disclosure an apparatus comprising means for sending, to a wireless communication device, a plurality of random access preambles in a plurality of beam directions, wherein each of the plurality of random access preambles is transmitted in a different beam direction, and wherein the plurality of random access preambles are associated with multiple random access opportunities of a random access attempt, and means for receiving, from the wireless communication device in response to one or more of the plurality of random access preambles, one or more random access response (RAR) messages in one or more beam directions of the plurality of beam directions.

In some embodiments, each RAR message spans a mini-slot or a slot. The means for receiving the one or more RAR messages is further configured to receive, in a subframe, a first control information and a first data of a first RAR message of the one or more RAR messages in a first beam direction of the one or more beam directions, and receive, in the same subframe after receiving the first control information and the first data, a second control information and a second data of a second RAR message of the one or more RAR messages in a second beam direction of the one or more beam directions. The means for receiving the one or more RAR messages is further configured to receive, in a subframe, a first control information of a first RAR message of the one or more RAR messages in a first beam direction of the one or more beam directions, receive, in the same subframe after receiving the first control information, a second control information of a second RAR message of the one or more RAR messages in a second beam direction of the one or more beam directions, receive, in the same subframe after receiving the second control information, a first data of the first RAR message in the first beam direction, and receive, in the same subframe after receiving the first data, a second data of the second RAR message in the second beam direction. The apparatus further comprises means for receiving from the wireless communication device, a rule for transmitting multiple random access preambles using multiple random access opportunities in different beam directions per random access attempt prior to RAR message monitoring. The apparatus further comprises means for determining whether the UE satisfies the rule, and wherein the plurality of random access preambles are transmitted when the UE is determined to satisfy the rule. The apparatus further comprises means for monitoring for a first RAR message of the one or more RAR messages in a first beam direction of the plurality of beam directions, and means for monitoring for a second RAR message of the one or more RAR messages in a second beam direction of the plurality of beam directions. The apparatus further comprises means for determining whether a first beam direction of the plurality of beam directions has a higher reception quality than a second beam direction of the plurality of beam directions, and means for monitoring for a first RAR message of the one or more RAR messages in the first beam direction in a RAR window associated with the first RAR message when the first beam direction is determined to have the higher reception quality than the second beam direction. The apparatus further comprises means for configuring a beam in at least a first beam direction and a second beam direction of the plurality of beam directions to monitor for the one or more RAR messages. The apparatus further comprises means for receiving, from the wireless communication device, a transmission configuration indicating information associated with a random access message transmission time interval that is less than a system nominal subframe.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a base station (BS), a configuration indicating that a random access message duration is limited to a portion of a subframe less than an entire duration of a slot of the subframe, wherein the configuration comprises a first field describing a reference numerology associated with the subframe, the reference numerology including at least one of a tone spacing in the subframe, a number of symbols in the subframe, or a duration of the subframe and wherein the configuration comprises a second field describing a second numerology to be used by the BS to communicate a random access message, the second numerology being different than the reference numerology;
receiving, by the BS from a user equipment (UE), a random access preamble initiating a random access procedure; and
in response to receiving the random access preamble, communicating, by the BS with the UE during the subframe based on the configuration and using the second numerology, the random access message, the random access message being associated with the random access procedure.

2. The method of claim 1, wherein the communicating includes:
transmitting, by the BS to the UE, the random access message via a physical downlink shared channel (PDSCH).

3. The method of claim 1, wherein the communicating includes:
receiving, by the BS from the UE, the random access message via a physical uplink shared channel (PUSCH).

4. The method of claim 1, wherein the configuration further indicates at least one of a starting time within the subframe or an ending time within the subframe for communicating the random access message.

5. The method of claim 1, wherein the configuration further indicates timing information for monitoring downlink control information associated with the random access message.

6. The method of claim 1, wherein the configuration further indicates that the random access message duration includes at least two symbols within the subframe.

7. The method of claim 1, wherein the configuration further indicates that the random access message duration includes exactly two symbols within the subframe.

8. The method of claim 1, wherein the transmitting includes:
transmitting, by the BS to the UE, a broadcast system information signal including the configuration.

9. The method of claim 1, wherein:
the subframe includes a plurality of slots, wherein the slot is one of the plurality of slots;
each of the plurality of slots includes a plurality of minislots;
each minislot of the plurality of minislots includes an equal number of symbols; and
the random access message duration is limited to a first mini-slot of the plurality of mini-slots.

10. The method of claim 1, wherein:
the receiving the random access preamble comprises receiving the random access preamble via a first beam direction; and
the communicating the random access message comprises communicating the random access message via the first beam direction;
further comprising:
receiving, by the BS from the UE, a second random access preamble via a second beam direction, the second beam direction being different than the first beam direction; and
communicating, by the BS with the UE during the subframe and based on the configuration, a second random access message.

11. The method of claim 10, wherein the communicating the random access message via the first beam direction and communicating the second random access message via the second beam direction comprises:
multiplexing at least one of first control information or first data associated with the random access message communicated via the first beam direction with at least one of second control information or second data associated with the second random access message communicated via the second beam direction.

12. The method of claim 11, wherein the multiplexing the at least one of the first control information or the first data associated with the random access message communicated via the first beam direction with the at least one of the second control information or the second data associated with the second random access message communicated via the second beam direction comprises:
multiplexing the first control information and the first data associated with the random access message communicated via the first beam direction with the second control information and the second data associated with the second random access message communicated via the second beam direction.

13. A method of wireless communication, comprising:
receiving, by a user equipment (UE) from a base station (BS), a configuration indicating that a random access message duration is limited to a portion of a subframe less than an entire duration of a slot of the subframe, wherein the configuration comprises a first field describing a reference numerology associated with the subframe, the reference numerology including at least one of a tone spacing in the subframe, a number of symbols in the subframe, or a duration of the subframe and wherein the configuration comprises a second field describing a second numerology to be used by the BS to communicate a random access message, the second numerology being different than the reference numerology;
transmitting, by the UE to the BS, a random access preamble initiating a random access procedure; and
communicating, by the UE with the BS during the subframe based on the configuration and using the second numerology, the random access message associated with the random access procedure.

14. The method of claim 13, wherein the communicating includes:
receiving, by the UE from the BS, the random access message via a physical downlink shared channel (PDSCH).

15. The method of claim 13, wherein the communicating includes:
transmitting, by the UE to the BS, the random access message via a physical uplink shared channel (PUSCH).

16. The method of claim 13, wherein the configuration further indicates at least one of a starting time within the subframe or an ending time within the subframe for communicating the random access message.

17. The method of claim 13, wherein the configuration further indicates timing information for monitoring downlink control information associated with the random access message.

18. The method of claim 13, wherein the configuration further indicates that the random access message duration includes at least two symbols within the subframe.

19. The method of claim 13, wherein the configuration further indicates that the random access message duration includes exactly two symbols within the subframe.

20. The method of claim 13, wherein the receiving includes:
receiving, by the UE from the BS, a broadcast system information signal including the configuration.

21. An apparatus comprising:
a transceiver configured to:
transmit a configuration indicating that a random access message duration is limited to a portion of a subframe less than an entire duration of a slot of the subframe, wherein the configuration comprises a first field describing a reference numerology associated with the subframe, the reference numerology including at least one of a tone spacing in the subframe, a number of symbols in the subframe, or a duration of the subframe and wherein the configuration comprises a second field describing a second numerology to be used by the apparatus to communicate a random access message, the second numerology being different than the reference numerology;
receive, from a wireless communication device, a random access preamble initiating a random access procedure; and
in response to receiving the random access preamble, communicate, with the wireless communication device during the subframe based on the configuration and using the second numerology, the random access message, the random access message being associated with the random access procedure.

22. The apparatus of claim 21, wherein the transceiver is further configured to communicate the random access message by:
transmitting, to the wireless communication device, the random access message via a physical downlink shared channel (PDSCH).

23. The apparatus of claim 21, wherein the transceiver is further configured to communicate the random access message by:
receiving, from the wireless communication device, the random access message via a physical uplink shared channel (PUSCH).

24. The apparatus of claim 21, wherein the configuration further indicates at least one of:
a starting time within the subframe;
an ending time within the subframe for communicating the random access message; or
timing information for monitoring downlink control information associated with the random access message.

25. The apparatus of claim 21, wherein the configuration further indicates that the random access message duration includes at least two symbols within the subframe.

26. An apparatus comprising:
a transceiver configured to:
receive, from a wireless communication device, a configuration indicating that a random access message duration is limited to a portion of a subframe less than an entire duration of a slot of the subframe, wherein the configuration comprises a first field describing a reference numerology associated with the subframe, the reference numerology including at least one of a tone spacing in the subframe, a number of symbols in the subframe, or a duratin of the subframe and wherein the configuration comprises a second field describing a second numerology to be used to communicate a random access message, the second numerology being different than the reference numerology;
transmit, to the wireless communication device, a random access preamble initiating a random access procedure; and
communicate, with the wireless communication device, during the subframe based on the configuration and using the second numerology, the random access message associated with the random access procedure.

27. The apparatus of claim 26, wherein the transceiver is further configured to communicate the random access message by:
receiving, from the wireless communication device, the random access message via a physical downlink shared channel (PDSCH).

28. The apparatus of claim 26, wherein the transceiver is further configured to communicate the random access message by:
transmitting, to the wireless communication device, the random access message via a physical uplink shared channel (PUSCH).

29. The apparatus of claim 26, wherein the configuration further indicates at least one of:
a starting time within the subframe;
an ending time within the subframe for communicating the random access message; or
timing information for monitoring downlink control information associated with the random access message.

30. The apparatus of claim 26, wherein the configuration further indicates that the random access message duration includes at least two symbols within the subframe.

* * * * *